United States Patent [19]

Smith et al.

[11] Patent Number: 5,387,146
[45] Date of Patent: Feb. 7, 1995

[54] INFANT FERRIS WHEEL

[76] Inventors: Jeffrey S. Smith; Dayna L. Smith, both of 5601 Maplewood St., Arlington, Tex. 76018; Larry L. Uland, P.O. Box 166, Argyle, Tex. 76226

[21] Appl. No.: 153,436
[22] Filed: Nov. 16, 1993
[51] Int. Cl.⁶ ..................... A63H 30/00; A63H 33/22; F21V 7/04
[52] U.S. Cl. ..................... 446/175; 446/227; 446/219; 446/485; 362/32
[58] Field of Search ............... 446/219, 175, 130, 227, 446/236, 242, 243, 265, 485; 362/32

[56] References Cited

U.S. PATENT DOCUMENTS

| | | | |
|---|---|---|---|
| 1,547,864 | 7/1925 | Etcheto | 446/243 X |
| 3,471,143 | 10/1969 | Lakin | 446/265 X |
| 3,723,722 | 3/1973 | Van Iderstine et al. | 362/32 |
| 3,927,482 | 12/1975 | Marcus . | |
| 3,983,647 | 10/1976 | Stubmann . | |
| 4,097,917 | 6/1978 | McCaslin | 446/175 X |
| 4,301,616 | 11/1981 | Gudgel | 446/47 |
| 4,363,181 | 12/1982 | Hyman et al. | 446/242 X |
| 4,640,034 | 2/1987 | Zisholtz . | |
| 4,670,820 | 6/1987 | Eddins et al. | 446/227 X |
| 4,756,109 | 7/1988 | Marcus . | |
| 4,878,869 | 11/1989 | Yamane et al. | 446/130 |
| 4,973,286 | 11/1990 | Davison | 446/227 X |
| 4,984,380 | 1/1991 | Anderson | 446/227 X |
| 5,029,047 | 7/1991 | Kachel | 362/32 |

FOREIGN PATENT DOCUMENTS

| | | | |
|---|---|---|---|
| 2642323 | 8/1990 | France | 446/227 |
| 1332077 | 10/1973 | Germany | 362/32 |
| 2258165 | 2/1993 | United Kingdom | 446/219 |

Primary Examiner—Max Hindenburg
Assistant Examiner—D. Neal Muir
Attorney, Agent, or Firm—Timmons & Kelly

[57] ABSTRACT

A cover is attached to a housing, and a hollow shaft extends from a motor in the housing to a rotatable disk within the cover. Several optical fibers extend between the disk and a light source in the housing. The forward ends of the fibers are attached around the circumference of the disk, and the fibers pass through the shaft. The fibers exit the shaft and turn forward toward the light source. A shaft extension disk positions the rearward ends of the fibers radially outward from the shaft. A light filter, having sectors of various colors, is located between the optical fibers and the light source. Ornaments are suspended from the disk, and cover the forward ends of the fibers when the ornaments are near the top of the disk, and reveal the ends of the fibers when the ornaments are near the bottom of the disk.

20 Claims, 5 Drawing Sheets

INFANT FERRIS WHEEL

RELATED DISCLOSURE

This is related to the disclosure filed with the U.S. Patent and Trademark Office as part of the Disclosure Document Program on Jan. 4, 1993, having Ser. No. 323,037.

BACKGROUND OF THE INVENTION

The present invention relates to mobiles and crib toys for the amusement of infants, and more particularly concerns an infant Ferris wheel responsive to certain ambient sounds or movements. The system of the present invention includes a vertically suspended rotatable disk, said disk being rotatable responsive to the detection of ambient sound and/or movement, means for decoratively illuminating a portion of said disk, and a sound producing means likewise responsive to the detection of ambient sound and/or movement. The infant Ferris wheel of the present invention is further attachable to a baby crib, and includes means for standing and operating independent of any structural support.

Many mobile type devices and crib toys have been proposed for the amusement of infants. These have typically included means for suspending a plurality of fanciful toys and trinkets under a canopy which is further affixed to the side of a baby crib high enough above the infant to keep out of said infant's reach, and have further included means for rotating said toys and trinkets about an axis of the canopy. More recent versions of these type devices have included means for making a musical melody, and means for illuminating an area adjacent to said device. Although such devices are well known in the art, none achieve the advantages of the present invention.

Examples of such prior art crib toy devices include that taught in U.S. Pat. No. 3,983,647 by Stubbmann, in which is proposed a driven mobile having a plurality of attention getting objects attached to a plurality of rigid arms extending from a shaft which is rotated by a magnetic driving mechanism, and further includes means for providing an audio signal. The teaching of Stubbmann further proposes means for canting the mobile at an unusual angle from the top of the baby crib to which it is attached for more readily being viewed by the infant. The driving mechanism of this device was designed for allowing the mobile to be driven without attention for an extended period of time. Perhaps the most significant of the several advantages of the present invention which are not achieved by the teaching of Stubbmann is the need for intermittent attention to the mobile by an attendant of the infant for whom the mobile is designed. A second concern which safety conscious parents may have regarding the teaching of Stubbmann relates to the readily accessible rigid arms of the mobile. Although said arms may be inaccessible to the young infant, the ready accessibility of said arms to an older sibling or to the older infant would be a matter of increasing concern.

Another example of a crib toy of the prior art which includes means for providing music can be found in the teaching of Hyman et al. in U.S. Pat. No. 4,363,181. In this teaching is provided a rotatable mobile having objects suspended from a canopy attached to a side of the crib. Included with the mobile is a motor and a music producing control circuit which further controls the length of the time periods in which said motor rotates and said music is played. Although the time periods in which this mobile is operable may be selectively varied, said time periods are responsive only to an attendant who is required to set said time periods. The mobile of this teaching is not responsive to the infant for whom it is intended to amuse. Furthermore, like so many of the mobiles and crib toys of the prior art, the suspended objects of this teaching have to be hung out of the reach of the infant for whom said objects are intended. Although the suspended objects of Hyman's teaching might indeed be visible to the infant, that said objects can only be observed at such a distance prevents the mobile devices of this type from accomplishing a significant objective of the present invention.

Examples of the prior art which attempt to overcome the necessity of requiring the attention of someone other than the infant in order for a crib toy to be placed in an operable mode, can be found in the teachings of Zisholtz and Anderson in the U.S. Pat. Nos. 4,640,034 and 4,984,380, respectively. In the teaching of Zisholtz is provided a sound producing mobile for connecting to a crib having a releasibly secured audio cassette player and a motor for rotating a plurality of suspended decorative mobile elements. Further included in this teaching is a voice actuated switch for operating the motor and audio cassette player responsive to the detection of ambient sound. In the teaching of Anderson is provided a fairly complex motor driven crib mobile suspended with an array of light and music producing means from the base of a passive infrared motion sensor activated lighting unit similar to those used in home security systems. The multitude of operable components provided in this teaching are responsive to the motion of an infant in the crib. Although these teachings provide devices which are responsive to both an older attendant and the infant for whom they are intended, each has the disadvantage of a singular dependance upon either a sound-, or a motion-, detection sensor. Those familiar with behavior modification based learning paradigms will recognize that being able to "manipulate" only a singular response of a subject, such as the subject's movement or noise, is significantly limiting. In this perspective, it is highly probable that there will be users of either of these two devices which have difficulty in diminishing a negative behavior (such as crying loudly) which one of the mobiles of these teachings has actually taught the infant. Furthermore, both devices of these teachings are designed for being viewed by the infant at a distance beyond said infant's reach.

While the mobile type devices and crib toys so disclosed in the prior art may be suitable for a particular purpose to which they address, it will be apparent to those skilled in the art that said devices would not be as suitable for the purposes of the present invention.

SUMMARY OF THE INVENTION

In view of the foregoing disadvantages inherent in the known types of mobile type devices and crib toys now present in the art, the invention disclosed herein provides a new and improved mobile type device and crib toy which includes a rotating infant Ferris wheel responsive to certain ambient sounds or movements, for providing visual and audible amusement to an infant. The system of the present invention includes a rotatable disk vertically suspended from a housing in which is means for rotating said disk. Further provided is means for decoratively illuminating a portion of said disk, a sound producing means, and means for varying the operating levels of each of said means for rotating, said means for decoratively illuminating, and said sound producing means. The infant Ferris wheel of the present invention is further attachable to a baby crib, and also includes means for standing and operating independent of any structural support such as the baby crib. Still further provided is a protective cover for allowing the infant to observe and even handle the Ferris wheel of the present invention without the potential of either breaking the device or harming the infant. As such, the general purpose of the present invention is to provide an infant Ferris wheel which has all the advantages of the prior art mobile type devices and crib toys, and none of the disadvantages.

To attain this, along with other objectives herein proposed, representative embodiments of the concepts of the present invention are illustrated in the appended drawings. The objective of the drawings and the corresponding detailed description herein, is to illustrate various components and embodiments of the present invention, and are not intended to be limiting in scope.

It is therefore an object of the present invention to provide a new and improved infant Ferris wheel which includes a moving visual stimulus for attracting and keeping the attention of an infant.

It is a further object of the present invention to provide a new and improved infant Ferris wheel which includes a sound producing means for attracting and keeping the attention of an infant.

It is still a further object of the present invention to provide a new and improved infant Ferris wheel having audible stimuli and moving visual stimuli for attracting and keeping the attention of an infant, in which is further provided means for varying the operation level of said audible and visual stimuli.

It is yet a further object of the present invention to provide a new and improved infant Ferris wheel having audible stimuli and moving visual stimuli for attracting and keeping the attention of an infant, in which is further provided means for detecting certain ambient movement and switch means responsive to said means for detecting, such that said audible and visual stimuli are responsive to certain movement of the infant.

It is still yet a further object of the present invention to provide a new and improved infant Ferris wheel having audible stimuli and moving visual stimui for attracting and keeping the attention of an infant, in which is further provided means for detecting certain ambient noise and switch means responsive to said means for detecting, such that said audible and visual stimuli are responsive to certain noises of the infant.

An even further object of the present invention to provide a new and improved infant Ferris wheel which is of durable and reliable construction.

It is yet another object of the present invention to provide a new and improved infant Ferris wheel which meets all federal, state, local and other private standards, guidelines, regulations and recommendations with respect to safety, environmental friendliness, energy conservation, etc..

An even further object of the present invention is to provide a new and improved infant Ferris wheel which is susceptible of a low cost of manufacture with regard to both materials and labor, and which accordingly is then susceptible of low prices of sale to the consuming public, thereby making such a mobile type device and crib toy economically available to the buying public.

These together with other objects of the invention, along with the various features of novelty which characterize the infant Ferris wheel of the present invention, are pointed out with particularity in the claims appended hereto and forming a part of this disclosure. The more important objects of the present invention have been outlined rather broadly in order that the detailed description thereof which follows may be better understood, and in order that the present contribution to the art may be better appreciated. For a better understanding of the invention, its operational advantages and the specific objects attained by its uses, reference should be made to the accompanying drawings and descriptive matter in which are illustrated various embodiments of the invention. Those skilled in the art will readily ascertain, however, that the invention is capable of other embodiments and of being practiced and carried out in various ways. In this respect, the details of construction disclosed herein, and the arrangements of the components set forth in the following description and appended drawings are for illustrative purposes, only, and are not intended to be limiting in scope. Those skilled in the art will appreciate, as well, that the conception upon which this disclosure is based, may readily be utilized as a basis for the designing of other structures, methods and systems for carrying out the several purposes of the present invention. Said other strutures may include, but are not limited to, those which are aesthetic in nature, or those which include the substitution of other materials as they become available, and which substantially perform the same function in substantially the same manner with substantially the same result as the present invention. It is important, therefore, that the claims appended hereto be regarded as including such equivalent structures, constructions, methods and systems insofar as these do not depart from the spirit and scope of the present invention.

BRIEF DESCRIPTION OF THE DRAWINGS

The invention will be better understood and objects other than those set forth above will become apparent when consideration is given to the following detailed description. Such description makes reference to the appended drawings, wherein.

DETAILED DESCRIPTION OF VARIOUS EMBODIMENTS

Figure 1:
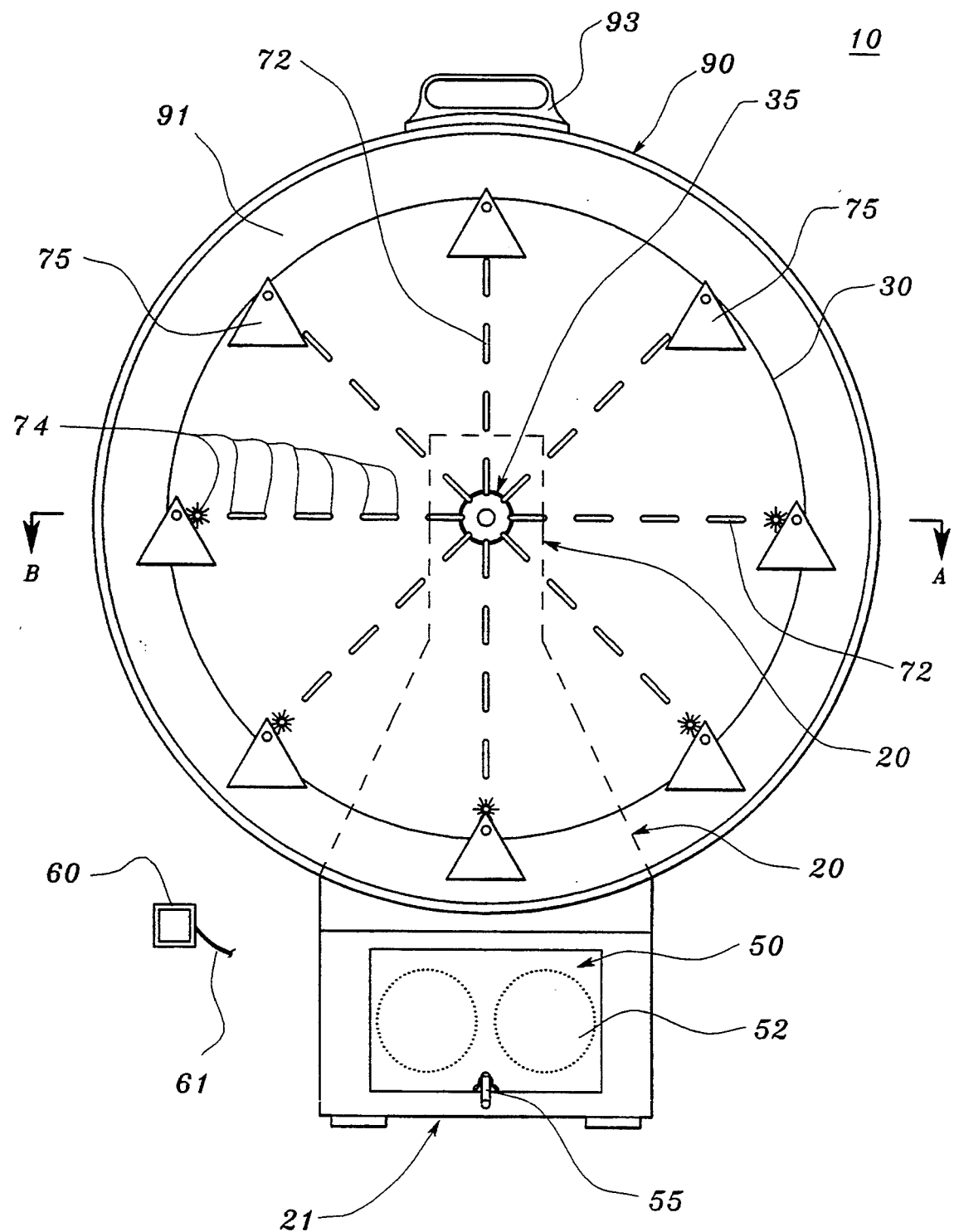
FIG. 1 is a front elevation of an embodiment of the infant Ferris wheel according to the present invention.
Figure 2:
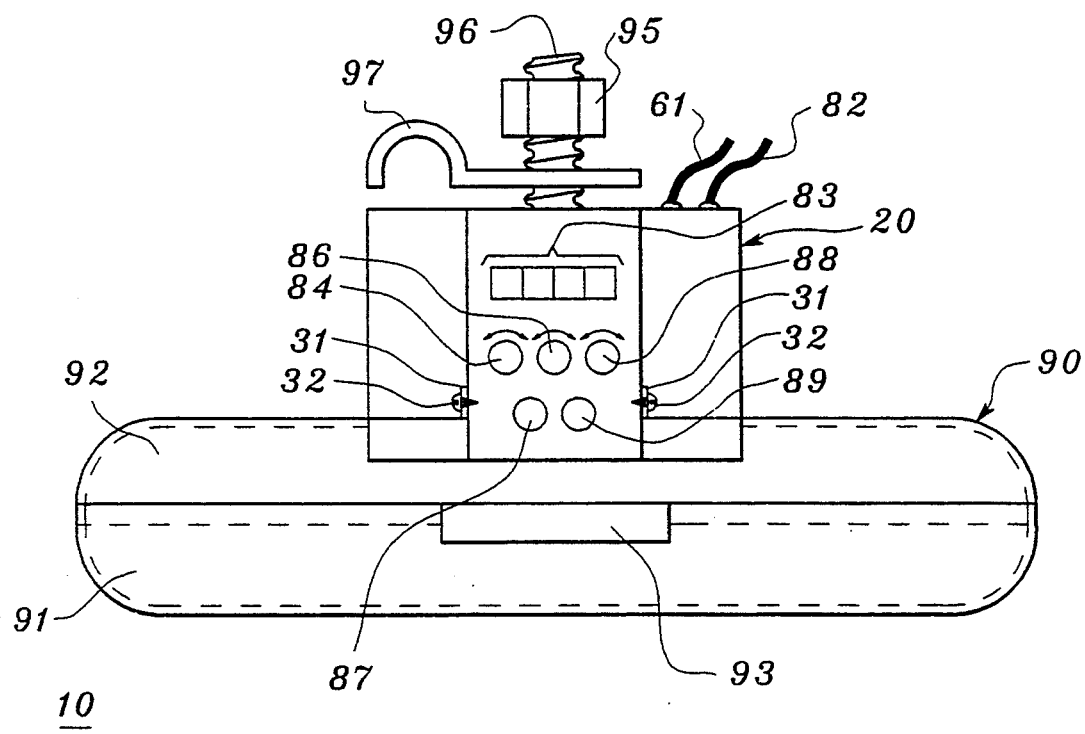
FIG. 2 is a top plan view of the embodiment of FIG. 1.
Figure 3:
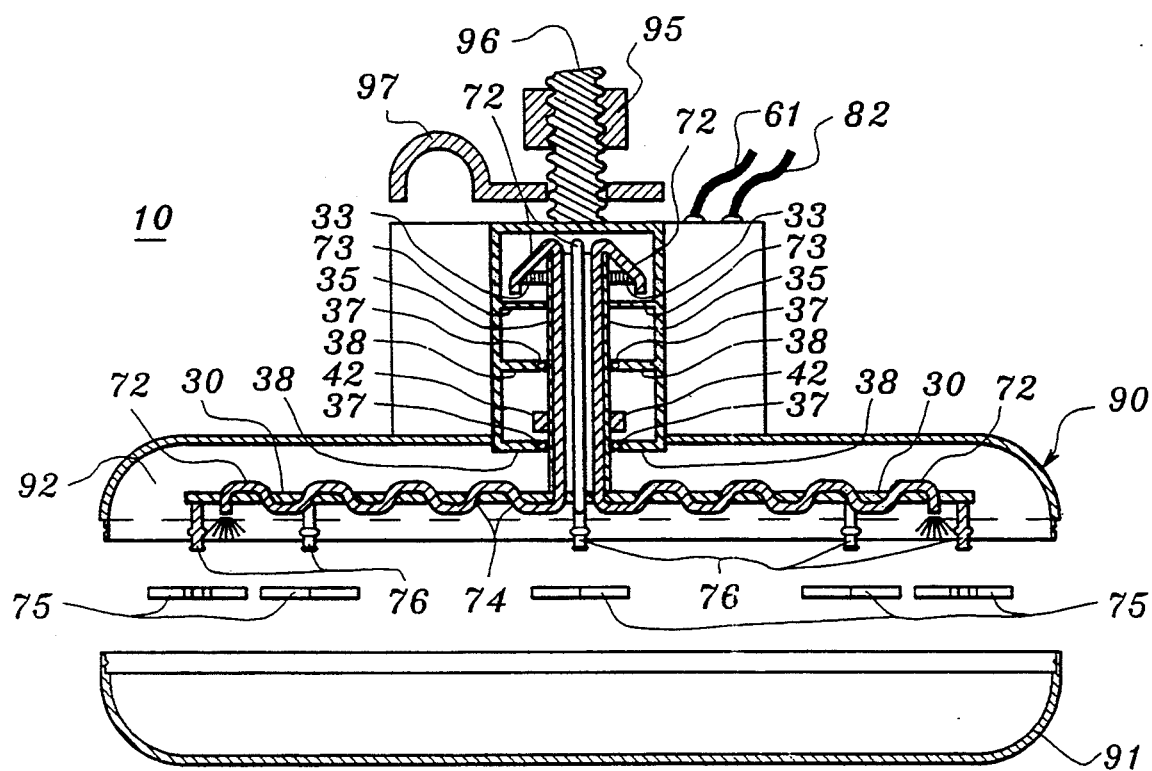
FIG. 3 is a section view of the embodiment of FIG. 1, along line A—B.
Figure 4:
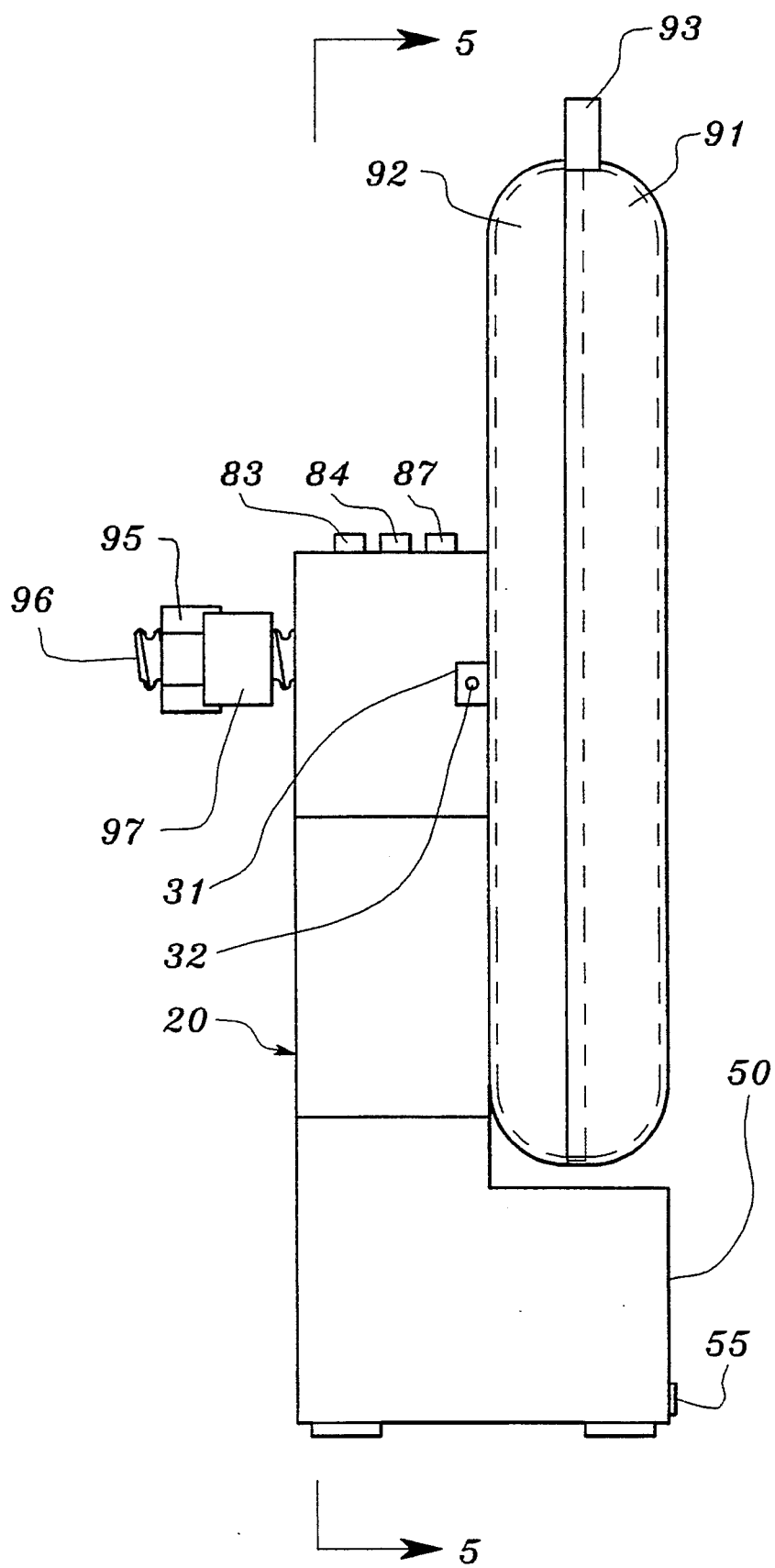
FIG. 4 is a side elevation of the embodiment of FIG. 1.
Figure 5:
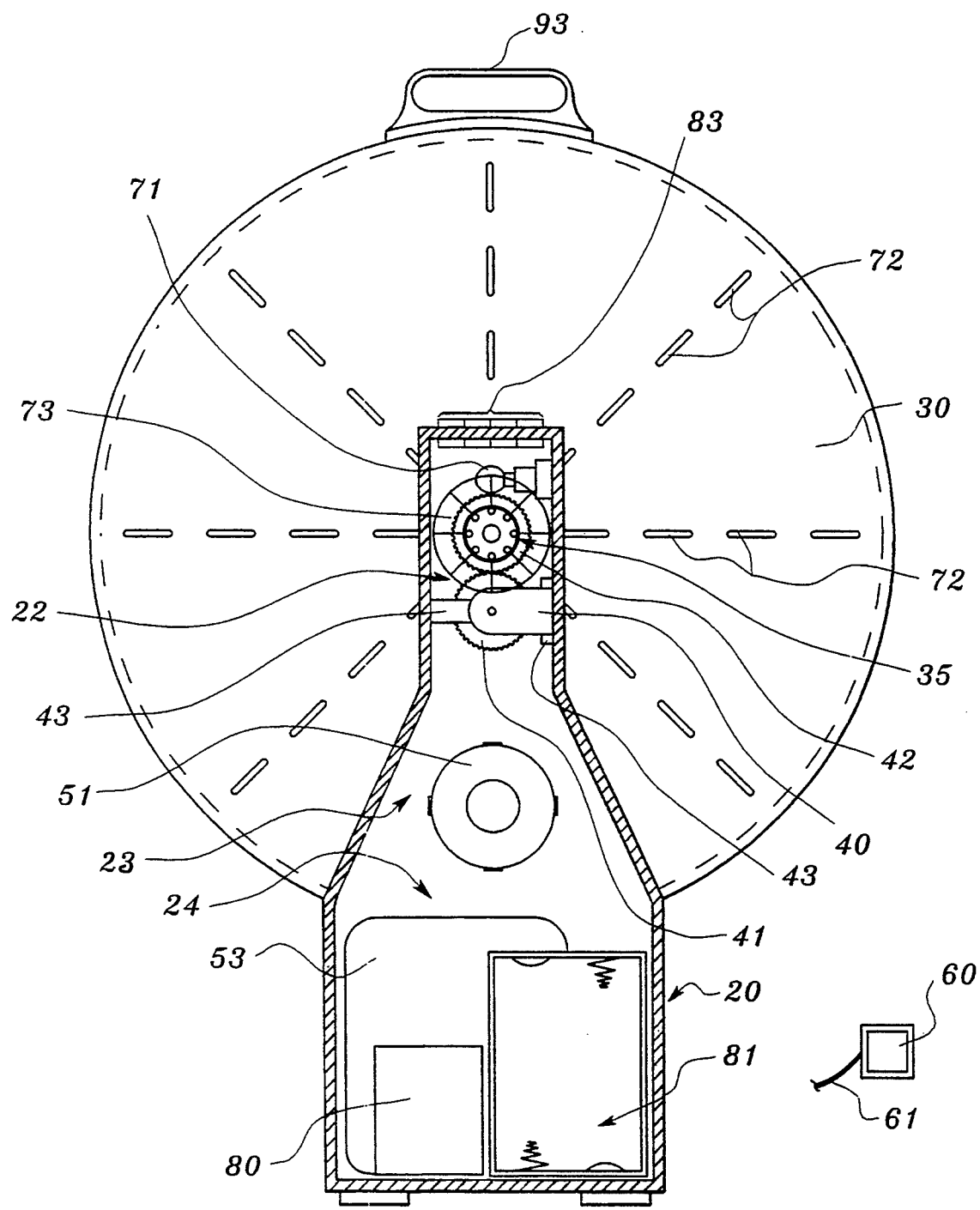
FIG. 5 is a section view of the embodiment of FIG. 4, along line 5—5.
Figure 6:
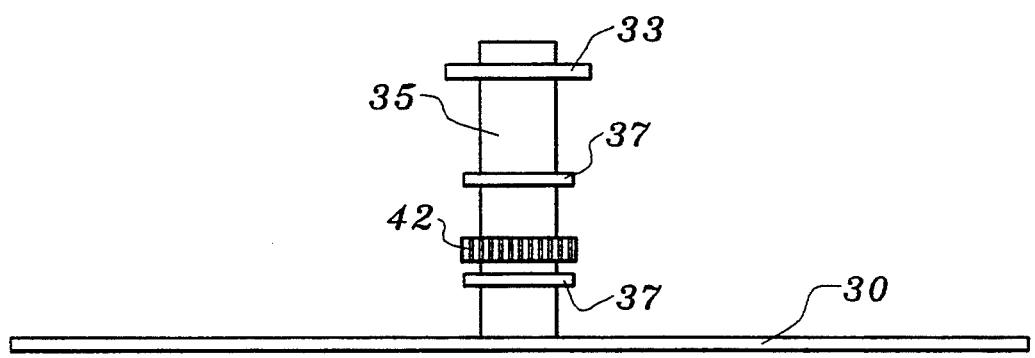
FIG. 6 is a top plan view of a rotatable disk according to the present invention.

The present invention comprises an improved infant Ferris wheel for providing visual and audible amusement to an infant. The system of the present invention includes a rotatable disk vertically suspended from a housing which includes means for rotating said disk, and means for decoratively illuminating a portion of said disk. Further provided in the infant Ferris wheel of the present invention is a sound producing means and means for varying the operating levels of each of said means for rotating, said means for decoratively illuminating, and said sound producing means. The infant Ferris wheel of the present invention is further attachable to a baby crib, and also includes means for standing and operating independent of any structural support such as the baby crib. Still further provided in the present invention is a protective cover for allowing the infant to observe and even handle the Ferris wheel of the present invention without the potential of either breaking the device or harming the infant. Various embodiments of the invention are illustrated in the appended drawings and described in greater detail, below. (All like numerical designations in the figures represent the same element.)

A preferred embodiment of an infant Ferris wheel 10 of the present invention is illustrated in FIGS. 1 through 6. Said Ferris wheel 10 comprises a housing means 20, including a base 21 for allowing said Ferris wheel 10 to stand on a flat surface and operate independent of any external structural support, an upper compartment 22 in communication with a middle compartment 23 which is in further communication with a lower compartment 24. Further provided in the Ferris wheel 10 is a rotatable disk 30 which is suspended from said housing means 20 via a hollow axial shaft 35 affixed to the center of the disk 30. Said axial shaft 35 is rotatably affixed to the upper compartment 22 of the housing means 20 via a pair of cylindrical ball bearing assemblies 37, which are affixed in suitable supporting means 38 located in the central portion, and on the front wall, of the upper compartment 22. Further affixed to the axial shaft 35 is a disk gear 42 and a cylindrical shaft extension disk 33. Further provided is means for attaching said Ferris wheel 10 to a baby crib, said means for attaching comprising a threaded nut 95 threadably affixed to a correspondingly threaded bolt 96 protruding from the rear wall of the middle compartment 23. Further suspended on the bolt 96 between the nut 95 and the rear wall is a rail clamp 97, for clamping the housing means 20 to a rail of the crib.

Still further provided is means for rotating said disk 30, comprising an electric motor 40 affixed within the upper compartment 22 via suitable supporting means 43 substantially adjacent to the axial shaft 35 of the rotatable disk 30. The electric motor 40 is further in communication with the axial shaft 35 via a drive shaft (not shown) and a drive gear 41, which is communicatably affixed to the disk gear 42. Said drive shaft is substantially parallel to the axial shaft 35. The electric motor 40 is further in communication with a power source, which comprises a typical transformer 80 and power cable assembly 82, a battery compartment 81, and conventional AC to DC switching means (not shown) for automatically switching the power source between the transformer 80 and the battery compartment 81 in conjunction with whether or not any power is available through the cable assembly 82.

An additional element of the Ferris wheel 10 is a sound producing means for producing various desirable sounds such as a mother speaking or lullaby type music. Said sound producing means is an audio tape player means 50 comprising a cassette holding door 52 and friction lock 55 for preventing an infant from opening said door 52, along with the typical electro-mechanical tape playing assembly and motor means 53 which is in electrical communication with the power source, an acoustic speaker means 51, an array of conventional push button control switches 83 and means for varying the operating level of said speaker means 51, said means for varying being a conventional volume control rotatable switch 86.

Still further provided in the Ferris wheel 10 is means for decoratively illuminating a portion of the disk 30. Said means for illuminating comprises a single light source 71 in communication with a plurality of optical fibers 72 at a first end of said fibers 72. The light source 71 is affixed within the upper compartment 22 substantially adjacent to the axial shaft 35. Said light source 71 is further in electrical communication with the power source and means for varying the operating level of the light source 71, said means for varying being a rotatable switch 84 connected to a variable resistor (not shown) which is electrically connected between the power source and the single light source 71.

Said means for decoratively illuminating further comprises a colored light filter 73 affixed to the interior side walls of the upper compartment 22 between the single light source 71 and the first end of said plurality of optical fibers 72. Said light filter 73 comprises a substantially circular disk having a central aperture through which the axial shaft 35 is freely extended. The light filter 73 is further divided into a plurality of variously colored sectors emanating from the central aperture. Each of said plurality of optical fibers 72 is connected at a second end to the rotatable disk 30 and arranged in a decorative pattern about the surface of said disk 30 via being woven into a plurality of corresponding disk apertures 74, and then channeled into the front opening of said axial shaft 35. Said plurality of optical fibers 72 further extends out the rear opening of said axial shaft 35 for reversing direction and being affixed to the cylindrical shaft extension disk 33 via a suitable affixing means such as a liquidly applied adhesive, so that the first end of said plurality of optical fibers 72 faces the single light source 71.

Furthermore, it is preferred that said plurality of optical fibers 72 is uniformly spaced about the cylindrical shaft extension disk 33 such that the rotation of said rotatable disk 30 causes each of said plurality of optic fibers 72 to pass into communication with each of the variously colored sectors of the colored light filter 73 at a point in time independent of the remainder of said plurality of optical fibers 72. This uniform arrangement of said optical fibers 72 about the axial shaft 35 is for creating a unique visual effect on the disk 30 in order to capture and retain the attention of an infant. The visual effect thus created includes a variety of colors appearing to move about the surface of the rotatable disk 30 via jumping from one of said optical fibers 72 to the next adjacent of said optical fibers 72, when the light source 71 is actuated and the rotatable disk 30 is rotating.

Figure 7:
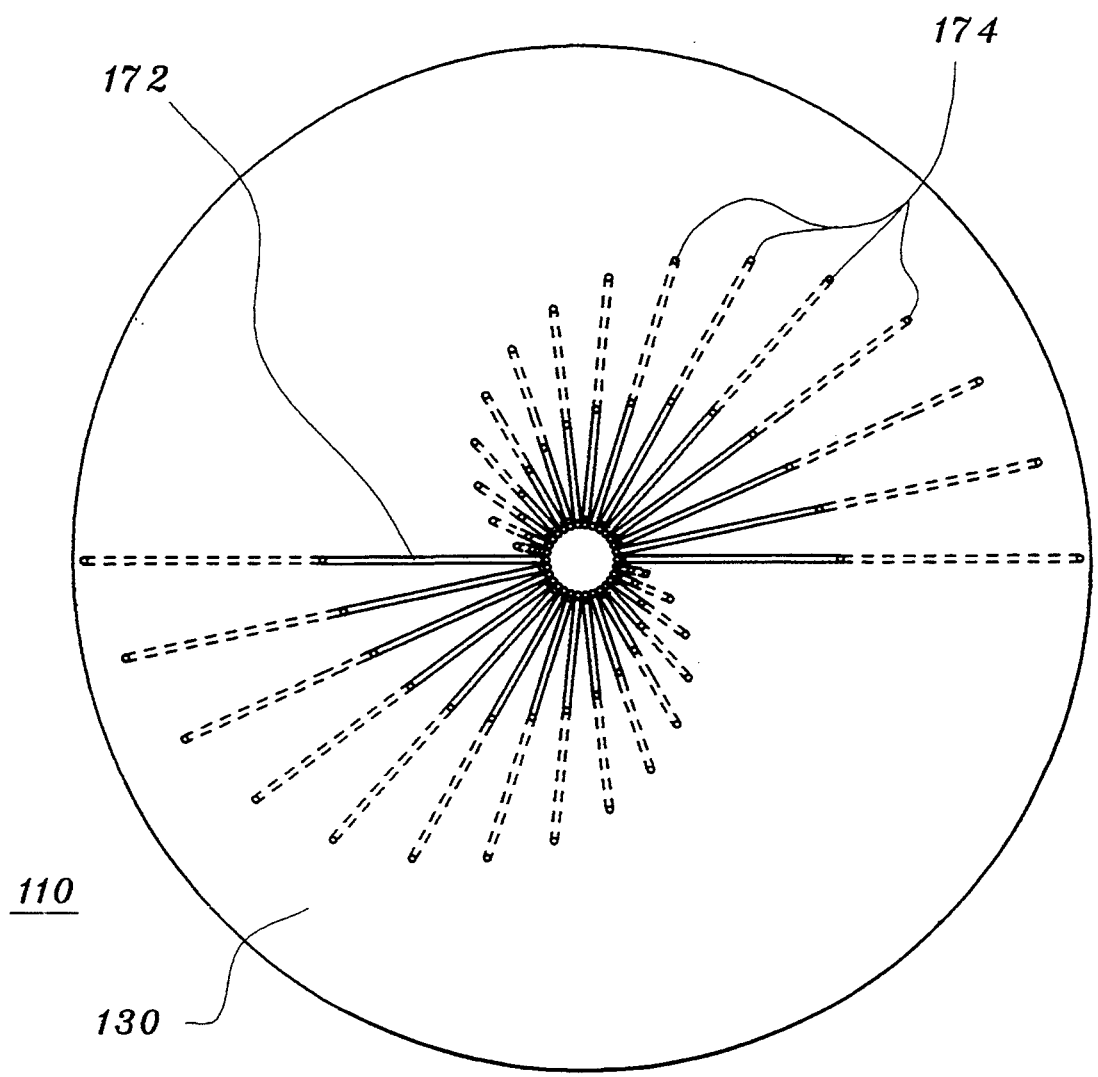
FIG. 7 is a front elevation of an alternate embodiment of the rotatable disk according to the present invention.

A wide variety of visual effects can be similarly created on the disk 30, via weaving the optical fibers 72 into said plurality of disk apertures 74 by using different weave patterns. For example, FIG. 7 illustrates components of a second embodiment of a Ferris wheel 110 in which a plurality of optical fibers 172 are woven into a plurality of disk apertures 174 of a rotating disk 130, for use with the Ferris wheel 110. The visual effect created in this embodiment when the disk 130 is rotated in a counter-clockwise direction is that of various light colors emanating from the center of the disk 130 and being carried from the center of said disk 130 toward the disk periphery in a first direction, and then abruptly returning to the disk center to restart the peripherally oriented journey in a second direction. This embodiment of the Ferris wheel 110 further illustrates that the inclusion of suspended objects from a rotating crib toy may not be necessary for creating an amount of visual activity sufficient to gain the attention of an infant.

Further provided in the Ferris wheel 10 of the present invention is a protective cover means 90, including a fixed rear portion 92 affixed to said housing means 20 via a plurality of suitable fastening means, such as threaded apertures 31 and correspondingly threaded bolts 32. Said cover means 90 further substantially covers the disk 30, for preventing an infant from having access to said disk 30, which rotates independently of said cover means 90. This particular feature of the present invention provides a significant safety and use benefit. By keeping the moving portion (the disk 30) of the Ferris wheel 10 inaccessible to an infant, said Ferris wheel 10 can be positioned within reach of the infant, such that said infant is allowed to view and listen to the Ferris wheel 10 from a close distance. Further provided with the cover means 90 is a handle 93 affixed to the top of the fixed rear portion 92, for readily carrying the Ferris wheel 10. Still further provided is a frictionally removable front face 91, for allowing older children and adults access to the disk 30 for purposes detailed below.

Still further provided in the Ferris wheel 10 is a plurality of suspended ornaments 75 uniformly spaced about the circumference of said rotatable disk 30, said ornaments 75 being affixed to said rotatable disk 30 via a loose fitting pivot means 76 and further including a bottom edge which has a greater mass than that of the other edges, such that said bottom edge remains in a position closer to the floor with respect to said other edges as the ornament is rotated about the circumference of said rotatable disk 30. Said plurality of suspended ornaments 75 may further comprise a plurality of bench like containers in which a variety of small trinkets and toys can be placed by older children or adults. This unique feature allows users of the Ferris wheel 10 to customize said Ferris wheel 10. Furthermore, this feature extends the useful life of said Ferris wheel 10 by allowing older children to interact with said Ferris wheel 10 in a more involved fashion than merely looking and listening to its aesthetic beauty.

After reviewing the artistic qualities of the present invention, it will be readlly apparent that an even greater number of visual enhancements may be made to the Ferris wheel 10, by adding painted or printed scenery to the disk 30 or to the cover means 90. Such scenery may visually create conventional looking structural supports for making the ornaments 75 appear as real rotatable benches suspended on the arms of a conventional fairground Ferris wheel. Furthermore, clouds and other background scenery may be affixed to the rear portion 92 of the cover 90, for making the Ferris wheel 10 appear as if is in a real park with stationary objects by which the ornaments 75 pass, such as clouds, circus tents, etc..

Still further provided for use with the Ferris wheel 10 is switch means responsive to means for detecting certain ambient movement or means for detecting certain ambient noises which the adult attendant of the infant may desire to use as an environmental triggering mechanism for actuating the various operations of the Ferris wheel 10. It is preferred that said means for detecting movement comprise a conventional infrared detector in electro-mechanical communication with a variable resistor of the Ferris wheel 10 which is controlled by a rotatable switch 87, which is in further electrical communication with the power source. It is also preferred that said means for detecting certain noises comprise a conventional microphone in electrical communication with a variable resistor controlled by a rotatable switch 89, which is in further communication with the power source. Said variable resistors further comprise means for varying the operating level, or sensitivity, of both means for detecting, so the adult attendant may selectively choose what level of movement or noise is sufficient to actuate the various operational functions of the Ferris wheel 10. It is further preferred that both the infrared detector and the microphone be affixed in a remote sensing unit 60, which is in communication with the Ferris wheel 10 via a conductor 61. Said remote sensing unit 60 working in conjunction with said means for varying can allow the adult attendant to be very selective with regard to the particular type and level of noise and/or sound which is desired to actuate the various operational functions of the Ferris wheel 10.

The inventor has given a non-limiting description of several embodiments of the present invention, to which many changes may be made without deviating from the spirit of the invention. After reviewing these various embodiments in light of the fore-mentioned disadvantages of the prior art mobile type devices and crib toys, those skilled in the art will readily ascertain the unique novelty of the infant Ferris wheel of the present invention. While this invention has been described with reference to illustrative embodiments, this description is not intended to be construed in a limiting sense. Various modifications and combinations of the various embodiments as well as other embodiments of this invention will be apparent to a person skilled in the art upon reference to this description. It is therefore contemplated that the appended claims cover any such modifications and/or embodiments that fall within the true scope of the present invention.

It is claimed:

1. A crib toy, comprising:
    a housing;
    a cover attached to the housing;
    a rotatable shaft extending from the housing into the cover;
    a disk mounted on the shaft within the cover;
    means for rotating the shaft and the disk;
    a light source mounted within the housing;
    a plurality of optical fibers having a forward end attached to the disk and a rearward end near the light source.

2. A crib toy as recited in claim 1, wherein the shaft is a hollow cylinder having a forward end and a rearward end, and the optical fibers pass through the shaft.

3. A crib toy as recited in claim 2, wherein the optical fibers enter the forward end of the shaft and exit the rearward end of the shaft.

4. A crib toy as recited in claim 3, wherein the light source is located forward of the rearward end of the shaft, and the optical fibers turn back toward the light source after exiting from the rearward end of the shaft.

5. A crib toy as recited in claim 4, further comprising a shaft extension disk, mounted on the shaft for positioning the rearward ends of the optical fibers radially outward from the shaft.

6. A crib toy as recited in claim 5, wherein the forward ends of the optical fibers are attached to the disk near the circumference of the disk.

7. A crib toy as recited in claim 6, further comprising a light filter located between the light source and the optical fibers.

8. A crib toy as recited in claim 7, wherein the light filter has sectors of various colors to cause light of various colors to be applied to the optical fibers.

9. A crib toy as recited in claim 8, further comprising a plurality of ornaments suspended from the disk, wherein the ornaments pivot to remain upright as the disk rotates.

10. A crib toy as recited in claim 9, wherein each ornament is located near the forward end of one of the optical fibers, and wherein the ornaments cover the forward ends of the optical fibers when the ornaments are near the top of the disk, and the ornaments reveal the forward ends of the optical fibers when the ornaments are near the bottom of the disk.

11. A crib toy, comprising:
a housing;
a cover attached to the housing;
a rotatable shaft extending from the housing into the cover;
a disk mounted on the shaft within the cover;
a motor for rotating the shaft and the disk;
a light source mounted within the housing;
a plurality of optical fibers having a forward end attached to the disk and a rearward end near the light source.

12. A crib toy as recited in claim 31, wherein the shaft is a hollow cylinder having a forward end and a rearward end, and the optical fibers pass through the shaft.

13. A crib toy as recited in claim 12, wherein the optical fibers enter the forward end of the shaft and exit the rearward end of the shaft.

14. A crib toy as recited in claim 13, wherein the light source is located forward of the rearward end of the shaft, and the optical fibers turn back toward the light source after exiting from the rearward end of the shaft.

15. A crib toy as recited in claim 14, further comprising a shaft extension disk, mounted on the shaft for positioning the rearward ends of the optical fibers radially outward from the shaft.

16. A crib toy as recited in claim 15, wherein the forward ends of the optical fibers are attached to the disk near the circumference of the disk.

17. A crib toy as recited in claim 16, further comprising a light filter located between the light source and the optical fibers.

18. A crib toy as recited in claim 17, wherein the light filter has sectors of various colors to cause light of various colors to be applied to the optical fibers.

19. A crib toy as recited in claim 18, further comprising a plurality of ornaments suspended from the disk, wherein the ornaments pivot to remain upright as the disk rotates.

20. A crib toy as recited in claim 19, wherein each ornament is located near the forward end of one of the optical fibers, and wherein the ornaments cover the forward ends of the optical fibers when the ornaments are near the top of the disk, and the ornaments reveal the forward ends of the optical fibers when the ornaments are near the bottom of the disk.

* * * * *